United States Patent [19]
Nalim et al.

[11] Patent Number: 5,894,719
[45] Date of Patent: Apr. 20, 1999

[54] METHOD AND APPARATUS FOR COLD GAS REINJECTION IN THROUGH-FLOW AND REVERSE-FLOW WAVE ROTORS

[75] Inventors: M. Razi Nalim, North Olmsted; Daniel E. Paxson, Parma Heights, both of Ohio

[73] Assignee: The United States of America, as represented by the Administrator of the National Aeronautics and Space Administration, Washington, D.C.

[21] Appl. No.: 08/846,088

[22] Filed: Apr. 18, 1997

[51] Int. Cl.⁶ .................................................. F02C 3/02
[52] U.S. Cl. ................................... 60/39.02; 60/39.45
[58] Field of Search ............................. 60/39.02, 39.45; 417/64

[56] References Cited

U.S. PATENT DOCUMENTS

| | | | |
|---|---|---|---|
| 3,095,704 | 7/1963 | Spalding | 60/39.45 A |
| 3,811,796 | 5/1974 | Coleman, Jr. et al. | 60/39.45 A |
| 3,874,166 | 4/1975 | Kirchhofer et al. | 60/39.45 A |
| 4,170,107 | 10/1979 | Horler . | |
| 5,267,432 | 12/1993 | Paxson . | |
| 5,284,013 | 2/1994 | Keller . | |
| 5,353,589 | 10/1994 | Althaus et al. . | |
| 5,522,217 | 6/1996 | Zauner . | |

OTHER PUBLICATIONS

Optimization of Wave Rotos for Use as Gas Turbine Engine Topping Cyuucles by Jack Wilson and Daniel E. Paxson, Dayton, OH; May 23–25, 1995.

Wave Rotor–Enhanced Gas Turbine Engines by Gerard E. Welch and Scott M. Jones and Daniel E. Paxson, San Diego, CA; Jul. 10–12, 1995.

*Primary Examiner*—Charles G. Freay
*Attorney, Agent, or Firm*—Kent N. Stone

[57] ABSTRACT

A method and apparatus for cold gas reinjection in through-flow and reverse-flow wave rotors having a plurality of channels formed around a periphery thereof. A first port injects a supply of cool air into the channels. A second port allows the supply of cool air to exit the channels and flow to a combustor. A third port injects a supply of hot gas from the combustor into the channels. A fourth port allows the supply of hot gas to exit the channels and flow to a turbine. A diverting port and a reinjection port are connected to the second and third ports, respectively. The diverting port diverts a portion of the cool air exiting through the second port as reinjection air. The diverting port is fluidly connected to the reinjection port which reinjects the reinjection air back into the channels. The reinjection air evacuates the channels of the hot gas resident therein and cools the channel walls, a pair of end walls of the rotor, ducts communicating with the rotor and subsequent downstream components. In a second embodiment, the second port receives all of the cool air exiting the channels and the diverting port diverts a portion of the cool air just prior to the cool air flowing to the combustor.

6 Claims, 9 Drawing Sheets

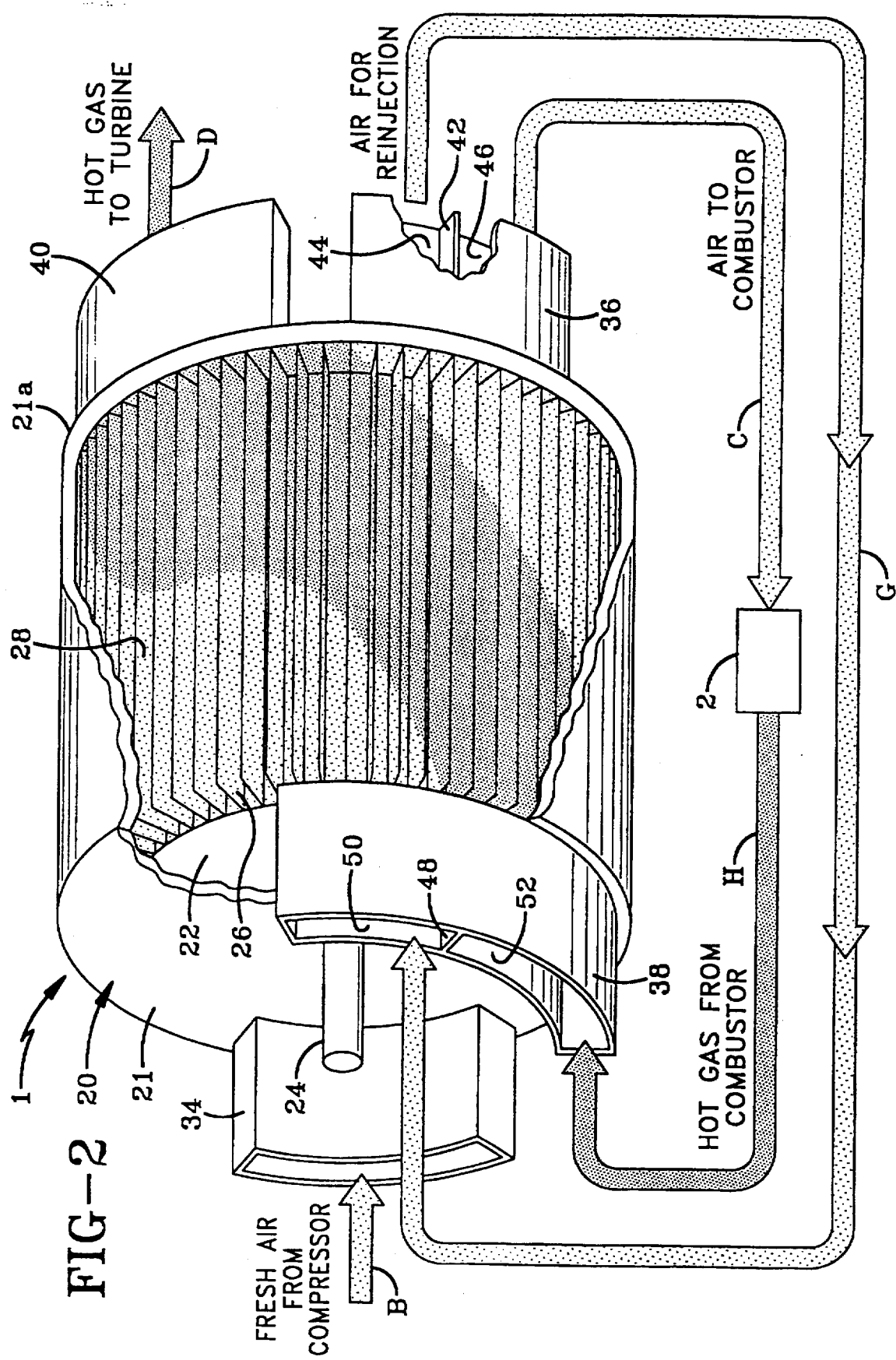

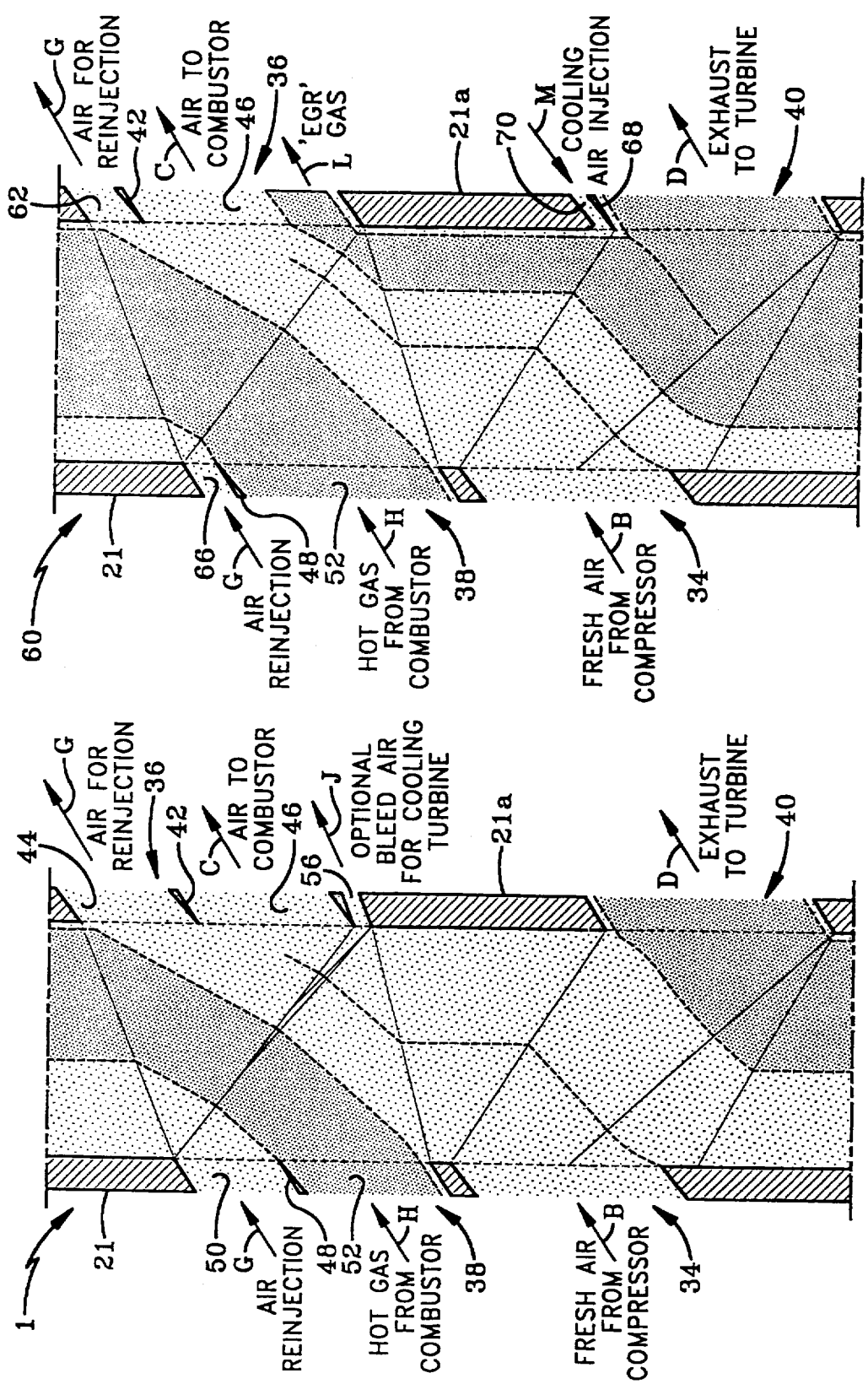

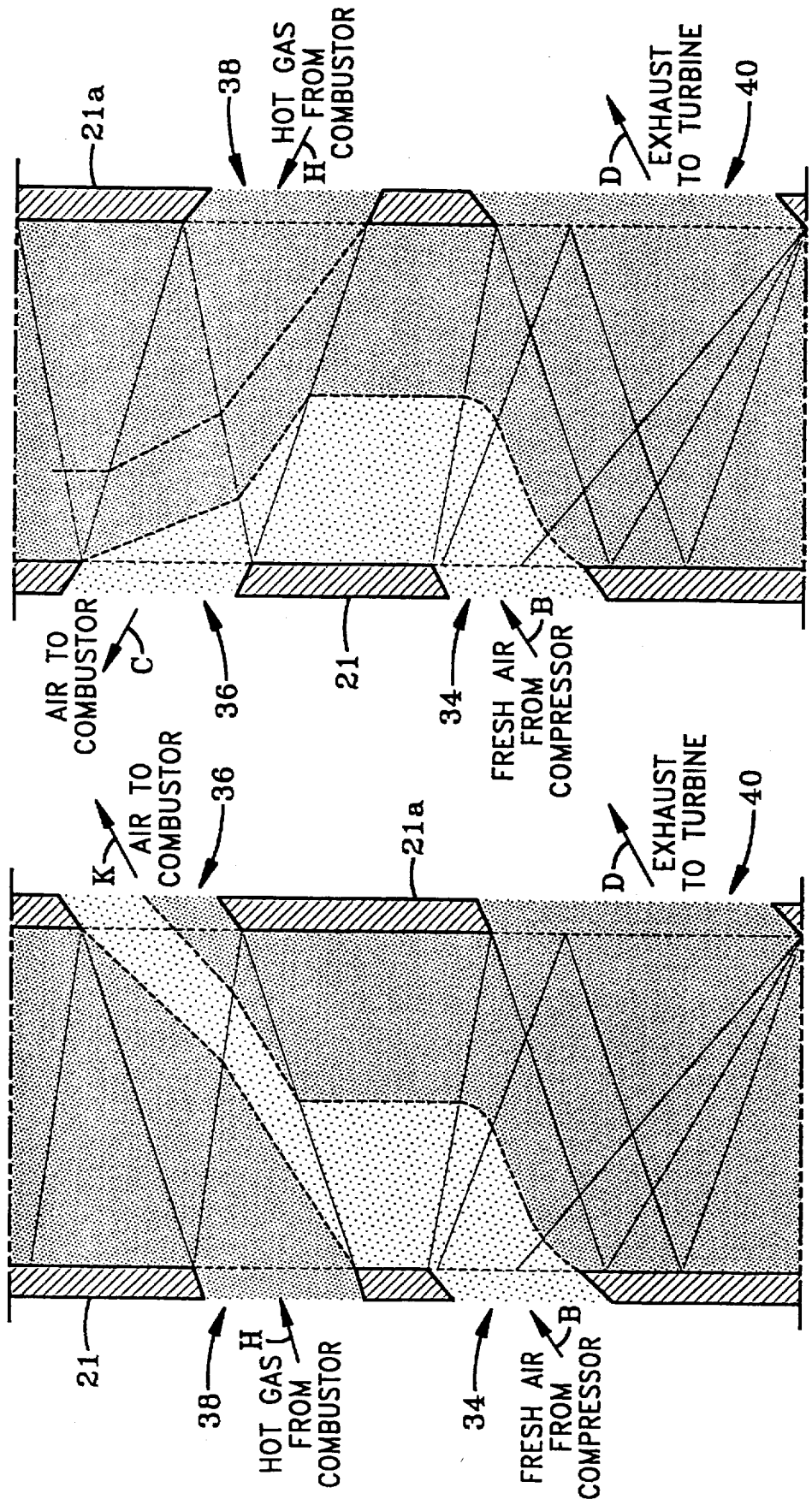

METHOD AND APPARATUS FOR COLD GAS REINJECTION IN THROUGH-FLOW AND REVERSE-FLOW WAVE ROTORS

ORIGIN OF THE INVENTION

The invention described herein was made by an employee and a contractor of the U.S. Government and may be manufactured and used by or for the Government for Governmental purposes without the payment of any royalties thereon or thereof.

BACKGROUND OF THE INVENTION

TECHNICAL FIELD

Generally, the invention relates to wave rotors. Particularly, the invention relates to a method and apparatus which reduces the temperature in through-flow and reverse-flow wave rotors and which reduces the temperature of a gas outflow driven by the wave rotors. Specifically, the invention relates to a method and apparatus which diverts a portion of cool air exiting the wave rotor as reinjection air and injects the reinjection air back into the wave rotor to evacuate residual hot gas from the wave rotor.

BACKGROUND INFORMATION

A wave rotor is a device that utilizes unsteady wave motion to exchange energy by direct work action between fluids. A wave rotor consists of an array of channels on the periphery of a rotor. As the wave rotor rotates, the ends of the channels are periodically ported to high and low pressure manifolds or ducts which generate and utilize waves in the channels. These pressure exchanging wave rotors are typically used as a topping unit to enhance the performance of a gas turbine engine. As a topping cycle in a gas turbine engine, the air from the engine compressor is directed into the wave rotor through a first port. The air flows into the channels of the rotor and is compressed by a series of compression or shock waves. This air leaves the wave rotor through a second port at a higher pressure than when it entered the wave rotor, and passes to a burner or combustor. After being heated in the burner, the gas returns to the wave rotor through a third port, driving a shock into the air residing in the channels. This gas is trapped within the channels as the third port closes at a high pressure. When the wave rotor rotates around to a fourth port, the gas expands out into the relatively lower static pressure in the fourth port and flows to the high-pressure engine turbine. In passing through the wave rotor, the air is first compressed and then expanded, thus, the wave rotor combines in a single device the functions performed by the compressor and turbine in a high spool. By using a wave rotor topping cycle, combustion temperatures greater than the turbine inlet temperature can be used since the gas leaving the combustor is cooled in expansion before being sent to the turbine. Also, since the rotor is washed alternately by cool inlet air and hot combustion gas, it is self-cooled and obtains a steady state temperature significantly lower than the combustion temperature.

In its simplest application, a wave rotor enhances the power and efficiency of a gas turbine by increasing the pressure of gas supplied to the turbine(s) using a wave rotor with straight axial channels. But there is also the possibility of the wave rotor itself acting as a turbine and producing shaft power. This is accomplished by slanting or curving the channels of the wave rotor. The implementation and benefits of the present invention apply equally to such wave turbines or wave rotors in which the channels are not of the straight, axial, constant area construction illustrated.

One problem with the above described wave rotors is that in a four-port pressure-exchange wave rotor discharging to a high-pressure turbine, the hot gas may fill the channel after compressing and ejecting the cool air, but it may not thereafter be completely evacuated from the channel. Much residual gas remains in the channel which is then only partially refilled with cool air. In a through-flow wave cycle where the gas streams enter and leave the wave rotor from opposite ends, the residual gas is hot gas and exits the channel with the cool air thus vitiating the cool air and causing excessive temperatures in the discharge duct, parts of the end wall and the subsequent components such as the combustor. Incidentally, since the residual gas must exit first, it also prevents bleed air from being bled from the output end of the wave rotor after partial compression of the driven air.

In a reverse-flow wave cycle where the gas streams enter and leave the wave rotor from the same end, the residual gas remains in the channel permanently. Repeated shock compression of this gas will overheat the channel walls at a center thereof.

This problem outlined above only arises in such wave rotors which, for the sake of simplicity in integration with the gas turbine engine, are designed to finally discharge the hot combustion gas only to a high pressure turbine. In the relevant prior art (not all patented) this relatively high pressure prevents full purging, resulting in either exhaust gas recirculation (EGR) back to the combustor (if through-flow cycle) or retention (if reverse-flow cycle) of remaining hot gas.

The problem is not present in the majority of prior art relating generally to wave rotors, which discharge to a low-pressure turbine instead of or in addition to a high-pressure turbine, and are therefore fully purged but mechanically more complicated and unsuited to many aeronautical and other applications.

No prior art methods and apparatuses have been developed which address this problem of residual hot gas remaining in the wave rotor channel overheating the wave rotor, the end walls of the wave rotor, the connecting ducts and subsequent downstream components such as the combustor.

U.S. Pat. No. 4,170,107 discloses a method and apparatus for intercooling the charged air of a pressure-charged internal combustion engine. A gas dynamic pressure wave machine draws in outside air and divides the air into a partial stream of scavenging air and a partial stream of charged air. The scavenging air flows through a heat exchanger as a coolant, and the charged air is intercooled in the scavenging air cooled heat exchanger.

U.S. Pat. No. 5,267,432 discloses a system and method of canceling expansion waves in a wave rotor. Special ports are provided on each side of the wave rotor to cancel expansion waves generated by the release of working fluid from the wave rotor. The expansion waves are reflected in the wave rotor from a reflecting portion, and provided to the special ports. Fluid present at the special ports has a stagnation pressure and a mass flow which is substantially the same as that of the cells of the wave rotor communicating with the special ports.

U.S. Pat. No. 5,284,013 discloses a gas turbine arrangement with a two-stage gas turbine having a main combustion chamber and a compressor. An energy exchanger interacts with a separate combustion chamber and is installed upstream of the gas turbine. Supercharged air from the energy exchanger is guided into a main combustion chamber immediately after compression in the wave rotor. U.S. Pat. No. 5,353,589 discloses a gas turbine plant having a water or steam cooled energy exchanger. Externally supplied water or steam is used to cool one of the hot outlet ducts of the wave rotor.

U.S. Pat. No. 5,522,217 discloses a pressure wave machine with integrated combustion and a method for cooling the rotor of the pressure wave machine. Cooling air conduits are arranged in the casing and passages of the wave rotor below and above the cells, viewed in the radial direction. The wave rotor is cooled by convective and conductive heat transfer to fluid in the cooling passages or at the external surfaces. A portion of air entering the wave machine is diverted before a location where fuel is introduced and guided through the cooling air conduits and cooling passages.

Other examples of pressure exchanging wave rotors are shown in U.S. Pat. Nos. 2,399,394, 2,461,186 and 2,946,184.

Although these prior art methods and apparatuses are adequate for the purpose for which they were intended, these prior art methods and apparatuses do not adequately evacuate hot gas from the channels of the wave rotor causing excessive heating of the channel walls, the end walls of the wave rotor, connecting ducts and subsequent components.

Therefore, the need exists for a method and apparatus for cold gas reinjection in through-flow and reverse-flow wave rotors which diverts a portion of the cool air compressed and ejected in a pressure-exchange wave rotor and reinjects the cool diverted air at the opposite end of the rotor, adjacent to the hot gas inlet, which diverted air forces the hot gas through an exhaust port, and which reduces the temperature of the channel walls, end walls of the wave rotor, connecting ducts and subsequent downstream components.

SUMMARY OF THE INVENTION

Objectives of the present invention include providing a method and apparatus for cold gas reinjection in through-flow and reverse-flow wave rotors which improves cooling of the wave rotor, end walls of the wave rotor, connecting ducts and subsequent downstream components.

Another objective is to provide a method and apparatus which improves specific power and reduces specific fuel consumption of a gas turbine engine.

A further objective is to provide such a method and apparatus which reduces the driven gas outflow temperature.

A still further objective is to provide a method and apparatus which diverts a portion of the cool air compressed and ejected in the pressure-exchange wave rotor as reinjection air and reinjects the reinjection air back into the wave rotor adjacent to the hot gas inlet.

Another objective is to provide a method and apparatus which replaces most or all of the post exhaust residual gas with reinjected cool air from a previous wave cycle.

A further objective is to provide a method and apparatus in which a wave rotor diverts or extracts bleed air from the channel of the wave rotor for cooling the turbines.

A further objective is to provide such a method and apparatus which eliminates or reduces exhaust gas recirculation (EGR); and which reduces the burner inlet and duct temperatures, thus reducing the material requirements and combustor size and cost.

A further objective is to provide such a method for controlling the temperature pattern factor experienced by the turbine and to cool the walls of the duct to the turbine with cooler air.

Another objective is to provide such a method and apparatus which reduces the potential for the formation of nitric oxide (NO) and nitrogen dioxide ($NO_2$), collectively referred to as $NO_x$; and which reduces end plate warpage.

A still further objective is to provide such a method and apparatus which is of simple construction, which achieves the stated objectives in a simple, effective and inexpensive manner, which solves problems and satisfies needs existing in the art.

These objectives and advantages are obtained by the apparatus of the present invention the general nature of which may be stated as including a wave rotor comprising: a housing; a rotor rotatably mounted within the housing; a plurality of channels carried by the rotor and extending radially outwardly therefrom; a first port positioned adjacent the channels and adapted for receiving a gas and supplying the gas into the channels; a second port positioned adjacent the channels and adapted for receiving a percentage of the exhaust gas exiting the channels; a diverting duct connected to the second port for receiving a first portion of the percentage of exhaust gas exiting the second port; a reinjection port positioned adjacent the channels and adapted for receiving the diverted first portion of gas exiting the second port and received from the diverting duct and for reinjecting the diverted first portion of gas back into the channels; a third port positioned adjacent the channels and adapted for receiving a second portion of the percentage of exhaust gas exiting the channels and for supplying the second portion of gas to the channels; and a fourth port positioned adjacent the channels and adapted for removing an additional percentage of exhaust gas exiting the channels.

These objectives and advantages are further obtained by the system of the present invention the general nature of which may be stated as including a housing; a rotor rotabaly mounted within the housing; a compressor; a plurality of channels carried by the rotor and extending radially outwardly therefrom, a first port positioned adjacent the channels and adapted for receiving cool air from the compressor and supplying the cool air into the channels; a diverted port positioned adjacent the channels and adapted for diverting a first portion of the cool air exiting the channels; a duct having a first end and a second end whereby the first end is connected to the diverting port and is adapted for receiving the diverted first portion of cool air; a reinjection port positioned adjacent the channels and adapted for receiving the diverted first portion of cool air from the duct and for reinjecting the diverted first portion of cool air back into the channels; a combustor; a second port positioned adjacent the channels and adapted for receiving a second portion of the cool air exiting the channels and for supplying said second portion of cool air to the combustor, said combustor converting said second portion of cool air into hot gas; a third port positioned adjacent the channels and adapted for receiving the hot gas from the combustor and for supplying the hot gas into the channels; a turbine; and a fourth port positioned adjacent the channels and adapted for removing a portion or all of the hot gas from the channels and supplying the portion of hot gas to the turbine.

These objectives and advantages are further obtained by the method of reducing a temperature of a wave rotor and of a gas outflow driven by said wave rotor, said method including the steps of: rotating the wave rotor, said wave rotor having a plurality of channels formed radially around a periphery thereof; injecting cool air into the channels of the wave rotor through a first port; forcing cool air out of the channels through a second port by injecting hot gas into the wave rotor through a third port; diverting a first portion of the cool air forced out of the channels through a diverting port; injecting the first portion of cool air into the channels through a reinjection port; and forcing at least a portion of the supply hot gas out of the channels through a fourth port.

BRIEF DESCRIPTION OF THE DRAWINGS

The preferred embodiments of the invention, illustrative of the best modes in which applicants have contemplated applying the principles, are set forth in the following description and are shown in the drawings and are particularly and distinctly pointed out and set forth in the appended claims.

FIG. 2 is a schematic diagram of the wave rotor of FIG. 1;

FIG. 3 is a schematic diagram showing an air flow cycle of a maximum air reinjection through-flow wave rotor;

FIG. 4 is a schematic diagram similar to FIG. 3 showing the air flow cycle of a partial-air reinjection through-flow wave rotor;

FIG. 8 is a schematic diagram similar to FIG. 4 showing the air flow cycle of a prior art through-flow wave rotor;

FIG. 9 is a schematic diagram similar to FIG. 6 showing the air flow cycle of a prior art reverse-flow wave rotor.

Similar numerals refer to similar parts throughout the drawings.

DESCRIPTION OF THE PREFERRED EMBODIMENTS

Figure 1:
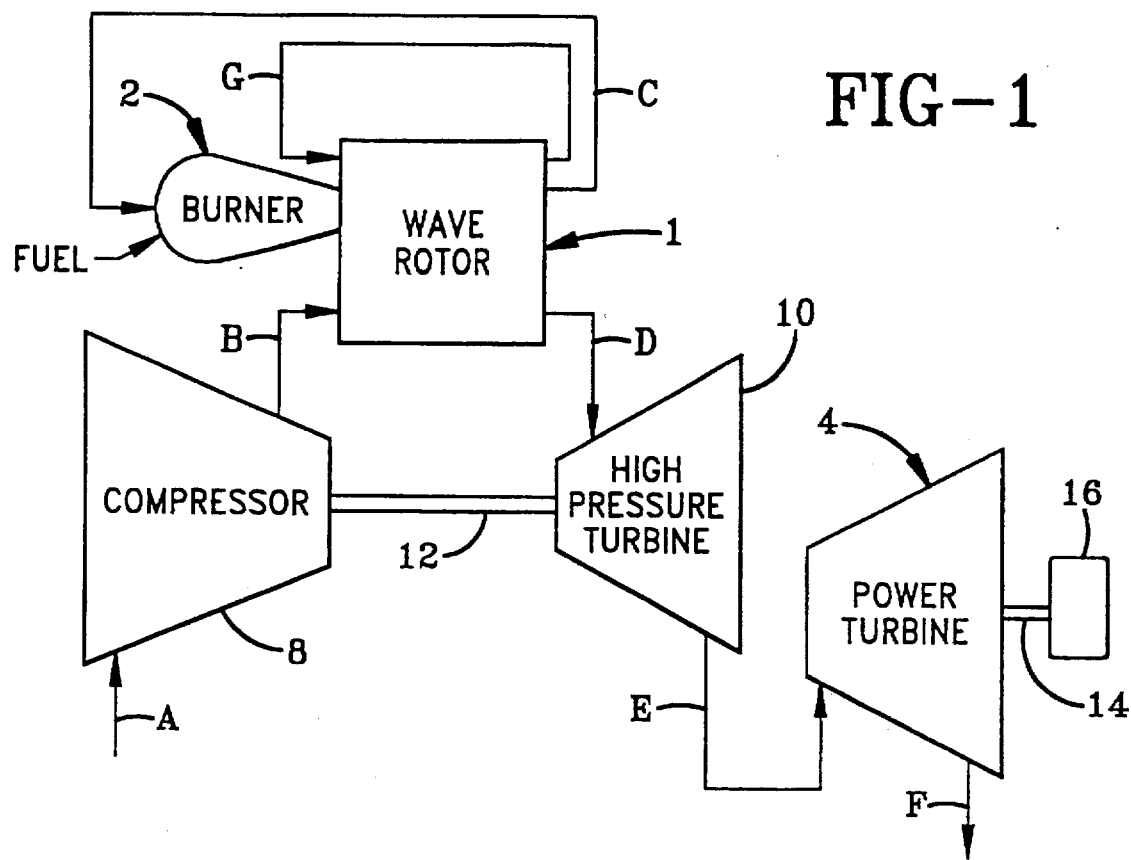
FIG. 1 is a block diagram showing the cold gas reinjection of the present invention in a through-flow wave rotor.

Referring to FIG. 1 of the drawings, there is shown therein a wave rotor 1 acting as a pressure exchanger with a conventional combustor or burner 2 and used as a topping unit to enhance the performance of a propulsive jet or power turbine 4. Generally, fresh air indicated by arrow A is input into a compressor 8 which supplies compressed cool fresh air B to wave rotor 1. Cool air B is further compressed within wave rotor 1 and is output as cool compressed air C at a higher pressure than when it entered wave rotor 1, and is supplied to burner 2. Cool compressed air C and fuel are combusted within burner 2 which outputs hot combusted gas H (FIG. 2) into wave rotor 1. Wave rotor 1 outputs the hot combusted gas as gas D into a high pressure turbine 10. Turbine 10 drives compressor 8 through a drive shaft 12 and supplies the hot gas to a jet nozzle or to a power turbine 4 as gas E. Power turbine 4 rotates a second drive shaft 14 which provides work to a device 16 which may be, for example, a generator for the production of power. Power turbine 4 outputs exhaust F into the atmosphere after utilizing hot gas E to drive device 16.

In accordance with one of the features of the invention and as described below in further detail, a portion of cool compressed air C output by wave rotor 1 is diverted at arrow G and reinjected into wave rotor 1 on an opposite side thereof adjacent to the input of hot gas H from burner 2. Wave rotor 1 is shown in detail in FIG. 2 and includes an outer casing 20 which has front and rear end walls 21 and 21a, respectively, and which houses an inner rotor 22. Rotor 22 has a drive shaft 24 extending from the front end thereof, and a plurality of spaced parallel walls 26 extending outwardly from the hub to the shroud of rotor 22 which form an array of parallel channels 28. The walls and channels may be straight, slanted or curved, but are shown straight and axial for clarity. As drive shaft 24 rotates rotor 22, the ends of channels 28 are periodically ported to high and low pressure manifolds or ports which generate and utilize waves within the channels, as described below. The ports will normally be canted at an angle for speed matching, but are shown perpendicular to the end wall for clarity.

Wave rotor 1 includes a first port 34 which receives compressed cool air B from compressor 8, a second port 36 which outputs compressed cool air C and G from wave rotor 1, a third port 38 which inputs hot gas H from combustor or burner 2 and which inputs reinjection air G from second port 36, and a fourth port 40 which outputs hot gas D to high pressure turbine 10.

In accordance with another of the features of the invention, second port 36 includes a splitter plate 42 which divides second port 36 into a diverting port 44 and a main output portion 46, hereinafter referred to as diverting port 44 and second port 36, respectively. Similarly, third port 38 includes a thin splitter plate 48 which divides third port 38 into a reinjection port 50 and a main input portion 52, hereinafter referred to as reinjection port 50 and third port 38, respectively. Diverting port 44 is connected to reinjection port 50 through a fluid connection such as copper tubing or other type of duct capable of transferring reinjection air G from rear end wall 21A to front end wall 21 of wave rotor 1.

Referring to FIGS. 3–6, wave rotor 1 has been unrolled from its annulus to illustrate the states of the working fluid in one of channels 28 as the one channel 28 moves about the circumference of wave rotor 1. Cool compressed fresh air B from compressor 8 enters channel 28 through first port 34 (FIG. 3) as the channel rotates to communicate with first port 34. The air is decelerated to rest in channel 28 by a compression wave caused by the closing of fourth port 40, as described below. Channel 28 then rotates to communicate with third port 38 to input hot gas H from combustor or burner 2 which further compresses the cool air B resident in channel 28 and which drives the cool air out of channel 28 through second port 36. Cool air C is directed to combustor or burner 2 where it is combusted and transformed into hot gas H and ported into third port 38 in a subsequent cycle.

In accordance with another of the features of the invention, a portion of the cool air forced out of channel 28 by the injection of hot gas H through third port 38 is diverted through diverting port 44 as reinjection air G. Reinjection air G bypasses combustion and is reinjected into channel 28 through reinjection port 50. Channel 28 further rotates to communicate with fourth port 40 where the lower static pressure in fourth port 40 forces the hot gas resident in channel 28 out fourth port 40 as hot gas D which flows to high pressure turbine 10 (FIG. 1). Another cycle begins with additional cool compressed fresh air B being injected into first port 34. Channel 28 rotates to close fourth port 40 creating the compression wave described above.

As can be seen from the cycle diagram of FIG. 3, cool air C which is output through second port 36 is a mixture of the cool reinjection air G from a previous cycle and fresh cool compressed air B from compressor 8. The compression or shock waves caused by the closure of port 4 and by the injection of hot gas H into channel 28 causes cool air C and reinjection air G to exit channel 28 of wave rotor 1 at a higher pressure than when it entered the wave rotor. Also, because pressure is a function of temperature, hot gas H from combustor 2 is at a relatively high pressure when trapped in channel 28. When channel 28 is rotated to communicate with fourth port 40, hot gas H naturally expands out into the lower static pressure environment of fourth port 40. Further, the relative amounts of hot gas H and reinjection air G which reside in channel 28 after reinjection port 50, second port 36 and diverting port 44 are closed, are determined by the relative amount of reinjected air which, in turn, is determined by the size of second port 38 and reinjection port 50.

A small bleed port 56 may also be formed in wave rotor 1 adjacent second port 36 and on an opposite side of second port 36 as that of diverting port 44. Bleed port 56 extracts bleed air J from channel 28 after hot gas H has generated a compression or shock wave within channel 28. Bleed air J is ported to high pressure turbine 10 or power turbine 4 for cooling of the turbines.

The injection of reinjection air G into channel 28 provides a layer of cool air adjacent to end walls 21 and 21A of wave rotor 1 and completely evacuates hot gas H from channel 28 during each respective cycle. As shown in FIG. 8, channel 28 of prior art wave rotors are filled with hot gas H throughout a majority of each cycle. Cool compressed air B enters first port 34 of the prior art wave rotor and is compressed by the compression or shock wave created by the injection of hot gas H through third port 38. A mixture of hot and cool air K exits second port 36 at a much higher temperature and pressure than cool air C which exits wave rotor 1 of the present invention. Hot gas H will extend along the entire length of channel 28 until channel 28 is rotated to communicate with fourth port 40. The lower static pressure in fourth port 40 allows a portion of hot gas H to expand out of channel 28 while the remaining portion of hot gas H remains within the channel until it exits through second port 36 as the mixture of hot and cool air K.

As can be seen in FIG. 8, front end wall 21 and rear end wall 21A of wave rotor 1 are constantly exposed to hot gas H raising the temperature thereof. Further, air K flows to combustor 2 at a relatively high temperature which, in turn, raises the temperature of combustor 2 and decreases the overall performance and durability of these prior art wave rotors. This exhaust gas recirculation (EGR) of a portion of combusted hot gas H being injected through third port 38 and exiting second port 36 to be combusted a second time is eliminated or reduced by the method and apparatus of cold gas reinjection of the present invention thus reducing the burner inlet and duct temperatures and reducing the material requirements and combustor size and cost. Further, the wave rotor of the present invention reduces the potential for $NO_x$ formation in the EGR gas, and reduces end plate temperature.

An air flow diagram of a partial air reinjection through-flow wave rotor of the present invention is shown in FIG. 4 and is indicated generally at 60. Wave rotor 60 is similar to wave rotor 1 and provides for partial air reinjection rather than the maximum air reinjection of wave rotor 1. Wave rotor 60 includes a diverting port 62 which diverts a smaller amount of air than occurs in wave rotor 1 and a reinjection port 66 which is relatively smaller in width than reinjection port 50 of wave rotor 1. Also, because the total volume of gas and air injected by ports 52 and 66 must fill channel 28, third port 38 of wave rotor 60 is relatively larger and allows a greater amount of hot has H to be injected into channel 28. Because the pressure in fourth port 40 for proper operation limits the volume of gas exiting to the turbine, this results in less than the entire amount of hot gas resident in channel 28 being expelled through fourth port 40 as exhaust gas D. Thus wave rotor 60 has a small amount of EGR gas L which is sent to combustor 2 along with cool gas C.

The smaller amount of reinjection air G which is reinjected through port 66 of wave rotor 60 mitigates any reduction in effective compression efficiency due to repeated compression shock and flow losses and due to the heat transfer by its cooling action. Also, the small amount of EGR retained is of potential benefit to some combustor designs, while the duct and burner temperatures are lower than in the prior art through-flow wave rotor of FIG. 8 with no reinjection at all.

A thin splitter plate 68 (FIG. 4) is inserted into fourth port 40 to form a cooling port 70 for the injection of a supply of cooling air M into the rear end of channel 28 adjacent to hot exhaust air D exiting fourth port 40. Cooling air M forms a thin cool layer of air between EGR gas L and rear end wall 21A which might otherwise be exposed to the high temperature of EGR gas L.

Figures 5, 6:
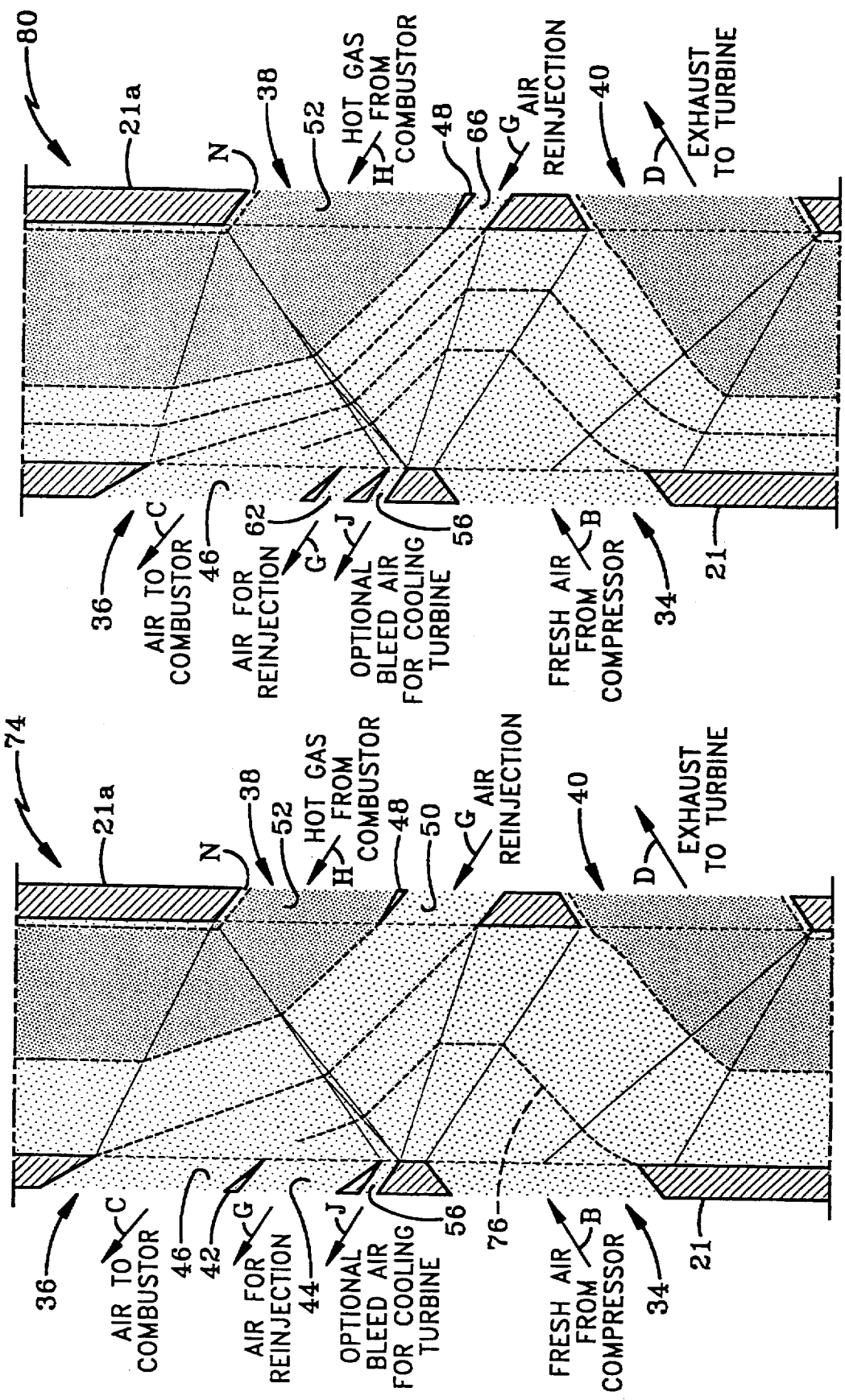
FIG. 5 is a schematic diagram similar to FIG. 4 showing the air flow cycle of a maximum air reinjection reverse-flow wave rotor.
FIG. 6 is a schematic diagram similar to FIG. 5 showing the air flow cycle of a partial-air reinjection reverse-flow wave rotor.

In accordance with another of the features of the invention, the method and apparatus of cold gas reinjection may be used in reverse-flow wave rotors shown in FIGS. 5 and 6 as well as the through-flow wave rotors of FIGS. 3 and 4. A maximum air reinjection reverse flow wave rotor is shown in FIG. 5 and is indicated at 74. Maximum air reinjection reverse flow wave rotor 74 is generally similar to maximum air reinjection through flow wave rotor 1 of FIG. 3 with the exception that second port 36 and third port 38 are formed in the opposite end walls as that of wave rotor 1. Wave rotor 74 includes splitter plate 42 which divides second port 36 to form diverting port 44 on the opposite side of second port 36 as that of wave rotor 1. Wave rotor 74 further includes splitter plate 48 which divides third port 38 to form reinjection port 50 on the opposite side of third port 38 as that of wave rotor 1.

Cool compressed air B enters channel 28 through first port 34 and is compressed by the compression wave caused by the closing of fourth port 40. Compressed cool air B exits channel 28 at the front end thereof through bleed port 56, diverting port 44 and second port 36. Reinjection air G which exits through diverting port 44 flows to the rear of wave rotor 74 through the fluid connection previously discussed and is reinjected through reinjection port 50. Reinjection air G which enters reinjection port 50 creates a shock wave which immediately precedes the in-flow of hot gas H from combustor 2. The shock wave created by reinjection air G compresses and forces the fresh air B and the reinjection air G from a previous cycle out of channel 28 through second port 36.

As channel 28 rotates, second port 36 is closed trapping reinjection air G and hot gas H therein until channel 28 rotates to communicate with fourth port 40 allowing the hot gas to exit the channel as exhaust gas D. Exhaust gas D is forced out fourth port 40 by the lower static pressure within fourth port 40. Reinjection air G from the current cycle is compressed and forced through second port 36 by the reinjection air from the next cycle as previously discussed. Also, a thin film of cooling air N originates in the combustor and flows adjacent to third duct 38 and rear end wall 21a for cooling thereof. Film N flows into channel 28 adjacent to hot gas H to separate hot gas H from the edge of third port 38 and rear end wall 21a. Film N exits channel 28 through fourth port 40 along with exhaust gas D.

The injection of reinjection air G into channel 28 provides a layer of cool air adjacent to front end wall 21 of wave rotor 1 and completely evacuates hot gas H from channel 28 during each respective cycle. Film N provides a layer of cool air adjacent to rear end wall 21a and exits channel 28 through fourth port 40. As shown in FIG. 9, channel 28 of prior art wave rotors are filled with hot gas H throughout a majority of each cycle. Cool compressed air B enters first port 34 of the prior art reverse flow wave rotor and is compressed by the compression or shock waves created by the closing of the fourth port 40 and by the injection of hot gas H through third port 38 and immediately exits channel 28 through second port 36. Hot gas H extends along the entire length of channel 28 while channel 28 rotates between second port 36 and first port 34. The prolonged exposure of channel 28 and end walls 21 and 21a to hot gas decreases the durability and increases the material requirements and cost of these prior art wave rotors. Channel 28 is intermittently cooled by air from only the front end with limited penetration, resulting in excessive temperature at the rear end and severe warpage of the rotor. Limitation of the combustor temperature for this reason will decrease the overall performance and efficiency of these prior art wave rotors.

A partial air reinjection reverse flow wave rotor is shown in FIG. 6 and indicated at 80. Partial air reinjection reverse flow wave rotor 80 is similar to maximum air reinjection reverse flow wave rotor 74 and includes smaller air reinjection port 66. Reinjection air G may be taken from a diverting port 62 similar to those of partial air reinjection through-flow wave rotor 60, or may be diverted from cool air C from second port 46. Smaller air reinjection port 66 injects a smaller amount of reinjection air G into channel 28 occupying a smaller amount of space in channel 28. This smaller amount of reinjection air G causes the reinjection air G of one cycle to remain in channel 28 for several cycles before being ejected through second port 36.

Reverse flow wave rotors 74 and 80 both allow bleed air J to be extracted through bleed port 56 for cooling of turbines 4 and 10. Thin film N of cooling air is injected through third port 38 adjacent to rear end wall 21a to separate rear end wall 21a from hot gas H while front end wall 21 is continuously exposed to compressed cool air B and reinjection air G.

Figure 7:
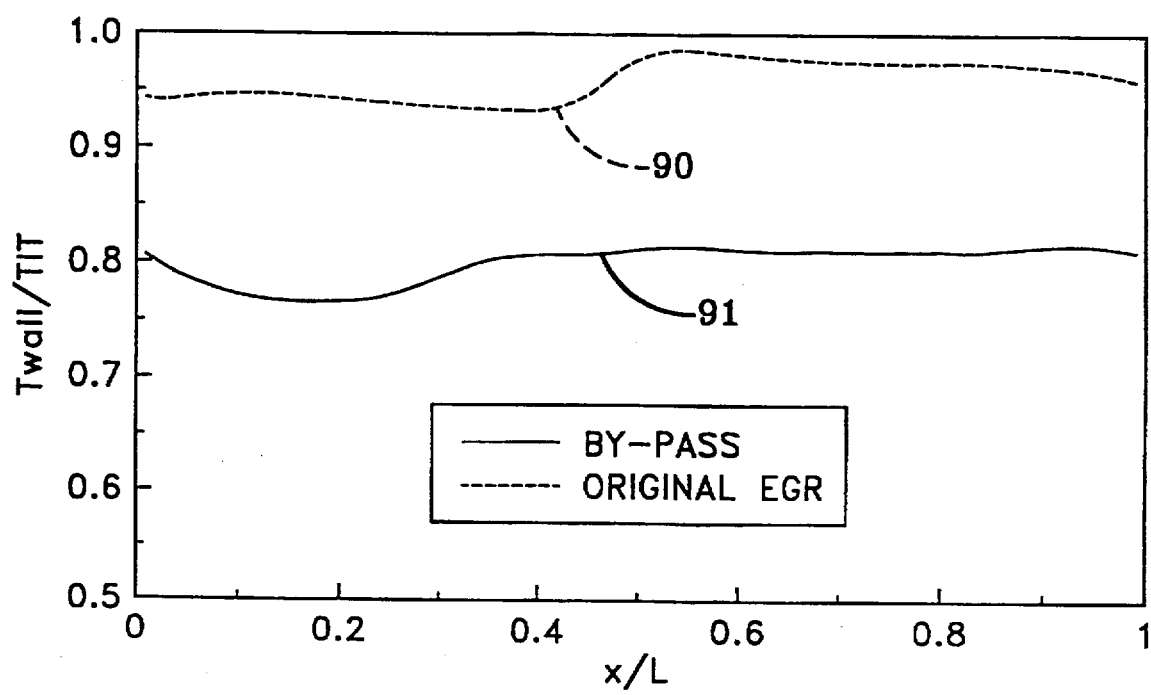
FIG. 7 is a graph of the passage wall temperature of a through-flow wave rotor comparing the ratio of the wall temperature to the temperature in the turbine before and after the air reinjection.

The temperature differential between a prior art through-flow wave rotor and the wave rotor of the present invention is shown by the graph of FIG. 7. The ratio of the channel wall temperature and the temperature in the turbine is indicated along the vertical axis while the position across channel 28 is shown along the horizontal axis where x correlates to a specific position within the channel measured from front end wall 21 and L represents the entire length of channel 28. Dashed line 90 shows that the temperature of the channel walls of prior art wave rotors is approximately 90%–100% of the temperature of the turbine while line 91 shows the temperature walls of channel 28 of through-flow wave rotor of the present invention is between approximately 75%–83% of the temperature of the turbine. This lower temperature produced by the cool air reinjection of the present invention results in lower rotor, burner inlet and duct temperatures which reduce the material and external cooling requirements and combustor size and cost and which improves specific power and reduces specific fuel consumption of gas turbine engine.

Accordingly, the method and apparatus for cold gas reinjection in through-flow and reverse-flow wave rotors includes splitter plate 42 which is retrofit within second port 36 to form diverting ports 44 and 62, and splitter plate 48 which is retrofit within third port 38 to form reinjection ports 50 and 66. Diverting ports 44 and 62 divert a portion of cool air which is reinjected within channel 28 through reinjection ports 50 and 66, respectively. Reinjection air G evacuates the hot gas resident in channel 28 and provides a layer of cool air adjacent to the front and rear end walls of rotors 1, 60, 74 and 80. Partial air reinjection through-flow wave rotor 60 may include a cooling port 70 for the injection of cooling air M which creates a thin film of cooling air to separate EGR gas L from rear end wall 21a. The reinjection of reinjection air G through reinjection ports 50 and 66 of through-flow wave rotors of I and 60, respectively, subsequent to the injection of hot gas H through third port 38 forces the hot gas toward the rear end of channel 28 and out fourth port 40 when channel 28 is rotated to communicate therewith. Similarly, the injection of reinjection air G through reinjection ports 50 and 66 of reverse flow wave rotors 74 and 80, respectively, prior to the injection of hot gas H through third port 38 keep the hot gas toward the rear end of channel 28 and forces the hot gas out fourth port 40 when channel 28 is rotated to communicate therewith.

Figure 10:
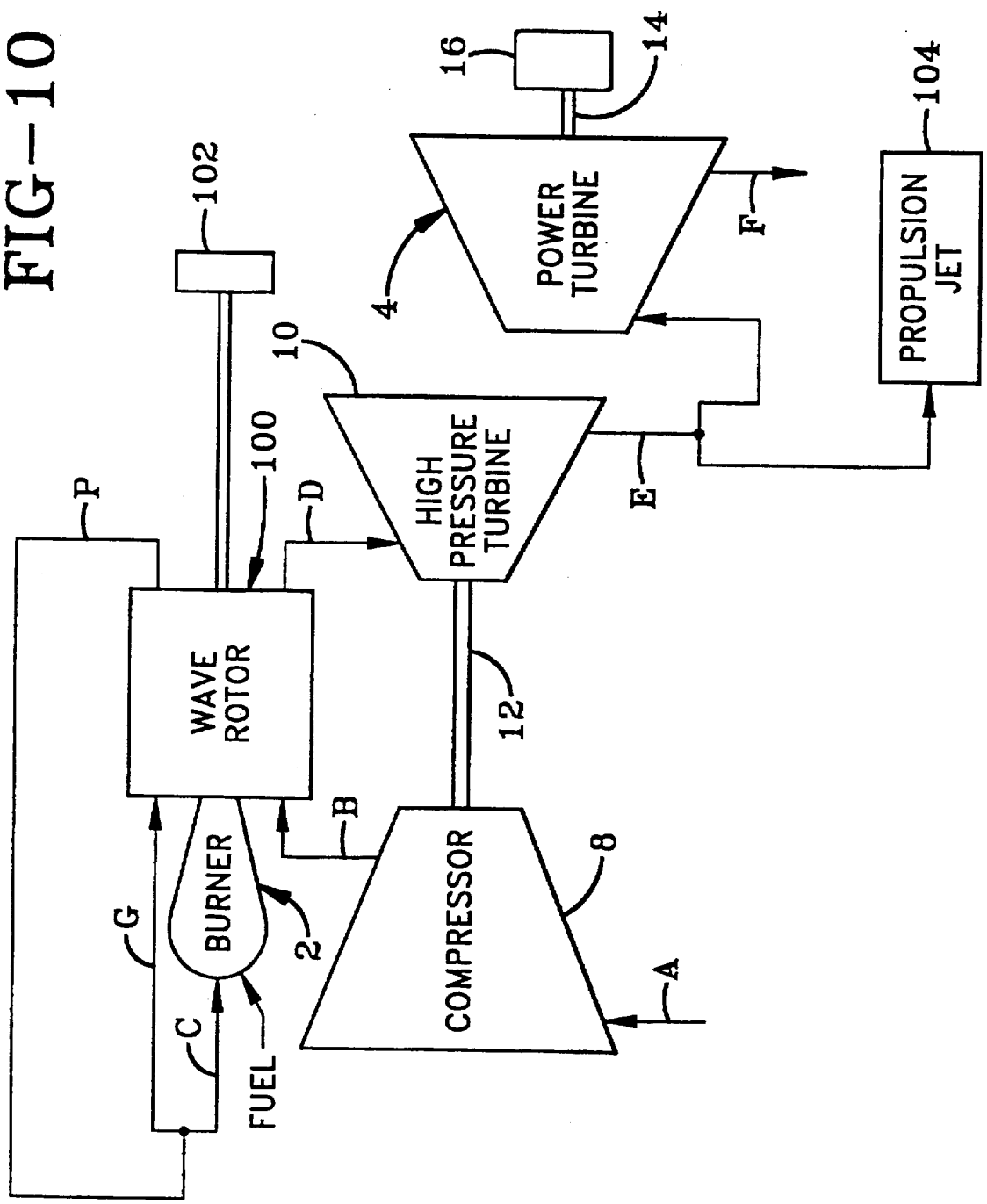
FIG. 10 is a block diagram similar to FIG. 1 showing a second embodiment of the wave rotor of the present invention.
Figure 11:
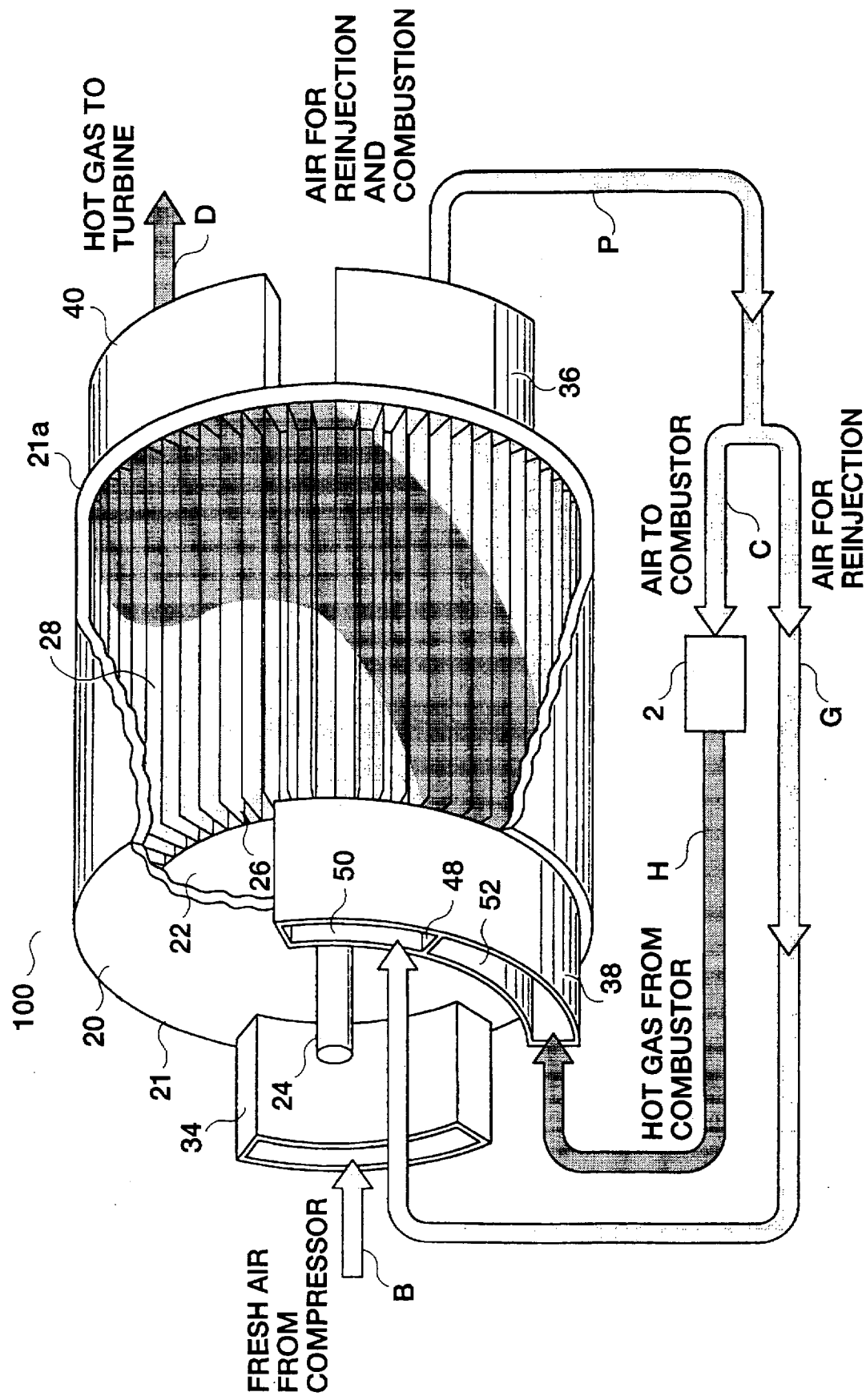
FIG. 11 is a schematic diagram of the wave rotor of FIG. 10.

A second embodiment of the wave rotor of the present invention is shown in FIGS. 10–11 and is indicated generally at 100. Wave rotor 100 is similar to wave rotor 1 except that wave rotor 100 is free of splitter plate 42 in second port 36. Second port 36 of wave rotor 100 outputs an exhaust gas P which is combined air for reinjection and combustion. Air P is split or divided into airs C and G for combustion and reinjection, respectively, at a location just before combustor 2. By dividing or separating air P at a location prior to the air being input into burner 2, second port 36 does not have to be modified and retrofit with splitter plate 42. Air C which is a portion of air P is similar to air C of the first embodiment and is input to the combustor which combusts the air into output hot gas H. Air G which is the remaining air P is similar to air G of wave rotor 1 and is input into reinjection port 50 as previously described. FIG. 10 shows wave rotor 100 in an alternative embodiment producing shaft power to a device 102. Also, gas E may be split or otherwise provided to a propulsion jet 104.

Figure 12:
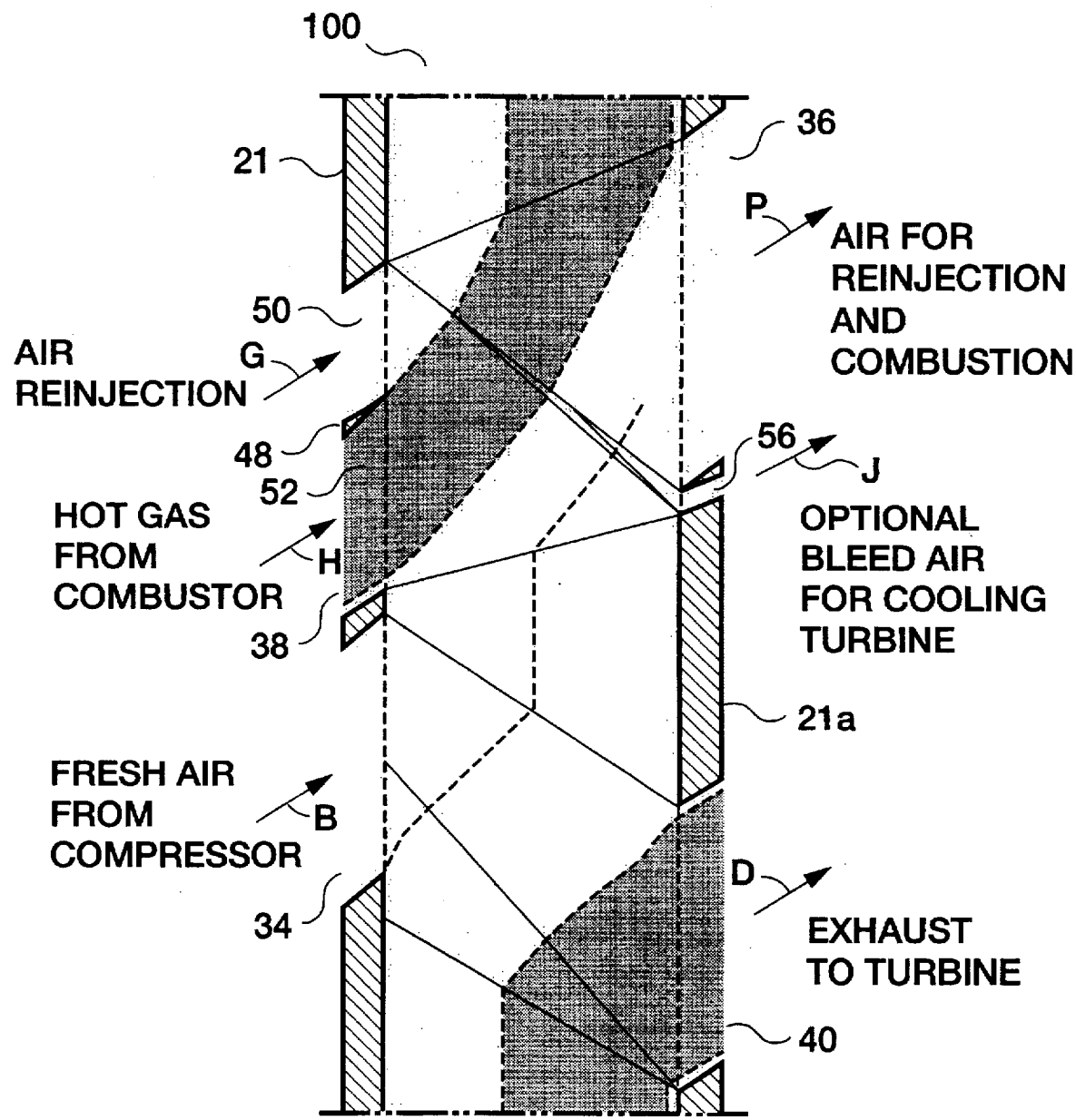
FIG. 12 is a schematic diagram showing the air flow cycle of a through-flow wave rotor of the second embodiment.
Figure 13:
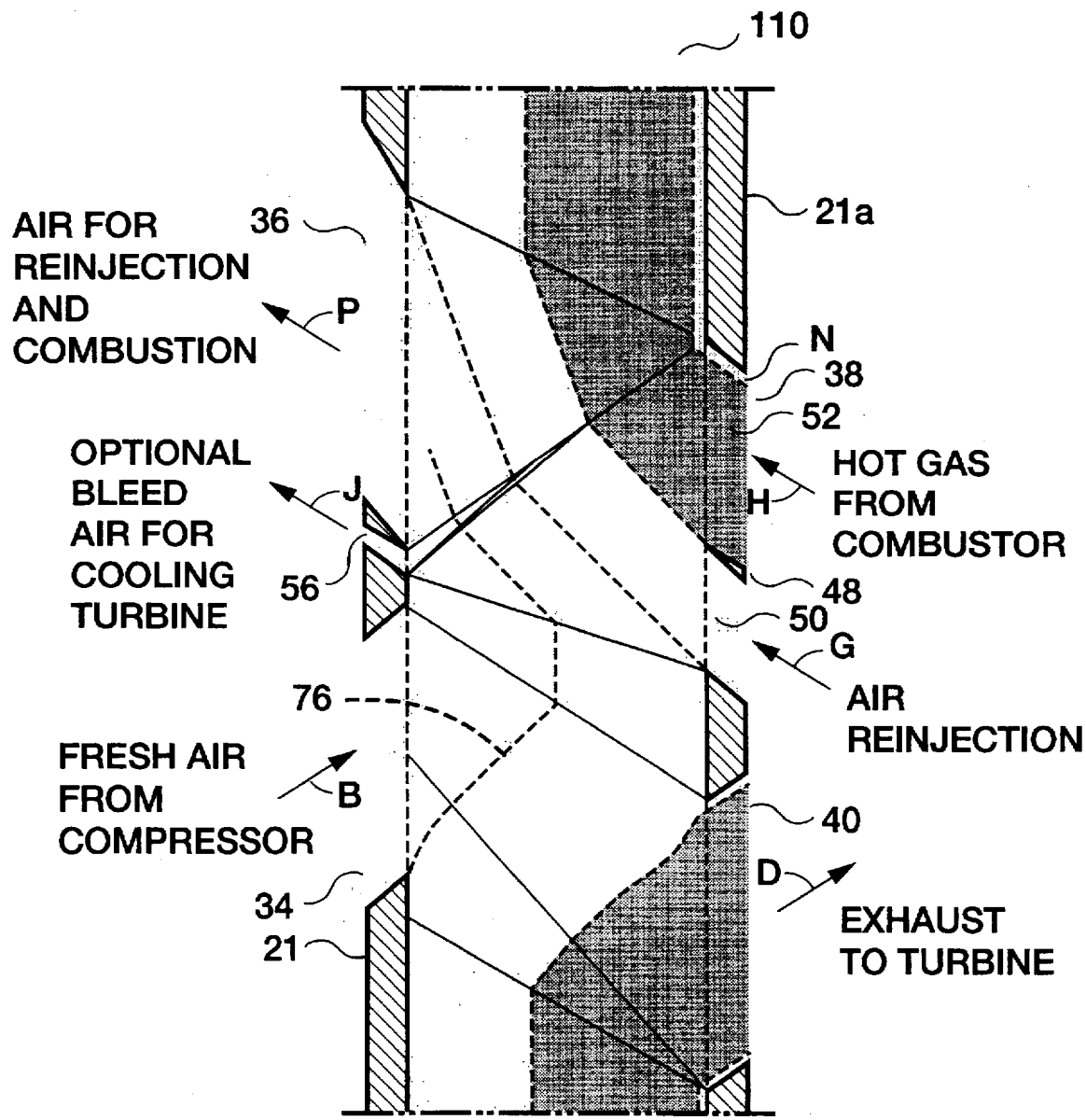
FIG. 13 is a schematic diagram similar to FIG. 12 showing the air flow cycle of a reverse-flow wave rotor of the second embodiment.

FIG. 12 shows an air flow diagram of wave rotor 100 free of splitter plate 42 and showing second port 36 outputting air P for reinjection and combustion. Similarly, FIG. 13 shows a reverse-flow wave rotor 110 free of splitter plate 42 and outputting air P for reinjection and combustion through second port 36. Wave rotors 100 and 110 function in a similar manner to wave rotors 1 and 74, respectively, and divide air P into airs C & G just prior to and before the air is input into combustor 2. Wave rotors 100 and 110 are shown with optional bleed ports 56 but it is understood that bleed ports 56 are optional and that bleed port 56 of wave rotor 100 may be formed in front end wall 21 of wave rotor 100 just above reinjection port 50 and after the channels communicate with reinjection port 50.

Accordingly, the improved method and apparatus for cold gas reinjection in through-flow and reverse-flow wave rotors is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved method and apparatus for cold gas reinjection in through-flow and reverse-flow wave rotors is constructed and used, the characteristics of the construction, and the advantageous, new and useful results obtained; the new and useful structures, devices, elements, arrangements, parts and combinations, are set forth in the appended claims.

We claim:

1. A wave rotor comprising:
   a housing;
   a rotor rotatably mounted within the housing;
   a plurality of channels carried by the rotor and extending radially outwardly therefrom;
   a first port positioned adjacent the channels and adopted for receiving a gas and supplying the gas into the channels;
   a second port positioned adjacent the channels and adopted for receiving a first percentage of the exhaust gas exiting the channels;
   a diverting duct connected to the second port for receiving a first portion of the percentage of exhaust gas exiting the second port;
   a reinjection port positioned adjacent the channels and adapted for receiving the diverted first portion of gas exiting the second port and received from the diverting duct and for reinjecting the diverted first portion of gas back into the channels;
   a third port positioned adjacent the channels and adapted for receiving a second portion of the percentage of exhaust gas exiting the channels and for supplying the second portion of gas to the channels; and
   a fourth port positioned adjacent the channels and adapted for removing a second percentage of exhaust gas exiting the channels, which added to said first percentage of exhaust gas equals 100% of the exhaust gas exiting the channels;
   a first splitter, extending between the reinjection port and the third port, and a second splitter, connected to the second port, to form the diverting duct;
   wherein the first port, third port, and reinjection port are located on one side of the rotor; and in which the second port and fourth port are located on the other end of the rotor; and further wherein said reinjection port is located adjacent said third port; and further wherein each of the channels has an arcuate path of travel; and in which each port communicates with each channel during only a portion of said arcuate path of travel.

2. A wave rotor comprising:
   a housing;
   a rotor rotatably mounted within the housing;
   a plurality of channels carried by the rotor and extending radially outwardly therefrom;
   a first port positioned adjacent the channels and adopted for receiving a gas and supplying the gas into the channels;
   a second port positioned adjacent the channels and adopted for receiving a first percentage of the exhaust gas exiting the channels;
   a diverting duct connected to the second port for receiving a first portion of the percentage of exhaust gas exiting the second port;
   a reinjection port positioned adjacent the channels and adapted for receiving the diverted first portion of gas exiting the second port and received from the diverting duct and for reinjecting the diverted first portion of gas back into the channels;
   a third port, positioned adjacent the channels, and adapted for receiving a second portion of the percentage of exhaust gas exiting the channels and for supplying the second portion of gas to the channels; and
   a fourth port positioned adjacent the channels and adapted for removing an additional percentage of exhaust gas exiting the channels; and
   a bleed port located adjacent the second port and adapted for bleeding an additional percentage of the exhaust gas exiting the channels.

3. The wave rotor defined in claim 2 in which the percentage of exhaust gas exiting through the second port is a first percentage of exhaust gas; in which the additional percentage of exhaust gas exiting the fourth port is a second percentage of exhaust gas; in which the additional percentage of exhaust gas exiting the channels through the bleed port is a third percentage of exhaust gas; and in which the first percentage of the exhaust gas plus the second percentage of exhaust gas plus the third percentage of exhaust gas equals 100% of the exhaust gas exiting the channels.

4. A wave rotor system comprising:
   a housing;
   a rotor rotatably mounted within the housing;
   a compressor;
   a plurality of channels carried by the rotor and extending radially outwardly therefrom;
   a first port positioned adjacent the channels and adapted for receiving cool air from the compressor and supplying the cool air into the channels;
   a second port positioned adjacent the channels and adapted for receiving a percentage of the cool air exiting the channels;
   a diverting duct connected to the second port for receiving a first portion of the percentage of cool air exiting the second port;
   a combustor connected to the second port and adapted for receiving a second portion of the percentage of cool air exiting the channels and converting said second portion of the percentage of cool air into a hot gas;
   a reinjection port positioned adjacent the channels and adapted for receiving the diverted first portion of cool air exiting the second port and received from the diverting duct and for reinjecting the diverted first portion of cool air back into the channels;

a third port positioned adjacent the channels and adapted for receiving the hot gas from the combustor and for supplying the hot gas into the channels;

a turbine; and a fourth port positioned adjacent the channels and adapted for removing a portion of the hot gas from the channels and supplying the portion of hot gas to the turbine;

a first splitter, extending between the reinjection port and the third port, and a second splitter, connected to the second port, to form the diverting duct;

wherein the first port, third port and reinjection port are located on one end of the rotor; and in which the second port and fourth port are located on the other end of the rotor; and further wherein said reinjection port is located adjacent said third port; and further wherein each of the channels has an arcuate path of travel; and in which each port communicates with each channel during only a portion of said arcuate path of travel.

5. A wave rotor system comprising:

a housing;

a rotor rotatably mounted within the housing;

a compressor;

a plurality of channels carried by the rotor and extending radially outwardly therefrom;

a first port positioned adjacent the channels and adapted for receiving cool air from the compressor and supplying the cool air into the channels;

a second port positioned adjacent the channels and adapted for receiving a percentage of the cool air exiting the channels;

a diverting duct connected to the second port for receiving a first portion of the percentage of cool air exiting the second port;

a combustor connected to the second port and adapted for receiving a second portion of the percentage of cool air exiting the channels and converting said second portion of the percentage of cool air into a hot gas;

a reinjection port positioned adjacent the channels and adapted for receiving the diverted first portion of cool air exiting the second port and received from the diverting duct and for reinjecting the diverted first portion of cool air back into the channels;

a third port positioned adjacent the channels, and adapted for receiving the hot gas from the combustor and for supplying the hot gas into the channels;

a turbine; and a fourth port positioned adjacent the channels and adapted for removing a portion of the hot gas from the channels and supplying the portion of hot gas to the turbine; and a bleed port located adjacent the second port and adapted for bleeding an additional percentage of the supply of cool air from the channels.

6. A method of reducing a temperature of a wave rotor and of a gas outflow driven by said wave rotor, said method including the steps of:

rotating the wave rotor, said wave rotor having a plurality of channels formed radially around a periphery thereof;

injecting cool air into the channels of the wave rotor through a first port;

forcing cool air out of the channels through a second port by injecting hot gas into the wave rotor through a third port;

diverting a first portion of the cool air forced out of the channels through a diverting port;

injecting the first portion of cool air into the channels through a reinjection port;

forcing at least a portion of the supply of hot gas out of the channels through a fourth port; and bleeding a supply of bleed air from the supply of cool air through a bleed port prior to the channels rotating to communicate with the second port.

* * * * *